United States Patent
Jang

(10) Patent No.: US 10,759,369 B2
(45) Date of Patent: Sep. 1, 2020

(54) APPARATUS AND METHOD FOR CONTROLLING VEHICULAR ACTIVE SEATBELT

(71) Applicants: HYUNDAI MOTOR COMPANY, Seoul (KR); KIA MOTORS CORPORATION, Seoul (KR)

(72) Inventor: Yoon Soo Jang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 42 days.

(21) Appl. No.: 16/105,115

(22) Filed: Aug. 20, 2018

(65) Prior Publication Data
US 2019/0184926 A1      Jun. 20, 2019

(30) Foreign Application Priority Data
Dec. 20, 2017    (KR) .................. 10-2017-0175912

(51) Int. Cl.
*B60R 21/01*        (2006.01)
*B60R 22/34*        (2006.01)
(Continued)

(52) U.S. Cl.
CPC ............ *B60R 21/01* (2013.01); *B60R 21/013* (2013.01); *B60R 22/34* (2013.01); *B60R 22/48* (2013.01);
(Continued)

(58) Field of Classification Search
CPC ....... B60R 21/01; B60R 21/013; B60R 22/48; B60R 22/34; B60R 2021/01265; B60R 2021/0018; B60R 2021/01034; B60R 2021/01286; B60R 2022/4816; B60R 22/195; B60R 21/00; B60W 50/0098; B60W 2520/18; B60W 2520/14;
(Continued)

(56) References Cited

U.S. PATENT DOCUMENTS 5,890,084 A      3/1999   Halasz et al.
2002/0087243 A1*  7/2002   Sekizuka ............... B60R 21/013
                                           701/45
(Continued)

FOREIGN PATENT DOCUMENTS

EP   1236620 A2    9/2002
GB   2436692 A    10/2007
(Continued)

OTHER PUBLICATIONS

Extended European Search Report dated Mar. 18, 2019 issued in European Patent Application No. 18188219.2.

*Primary Examiner* — Kimberly S Berona
*Assistant Examiner* — Seyyed Mustafa Sahafeyan
(74) *Attorney, Agent, or Firm* — Morgan, Lewis & Bockius LLP

(57) ABSTRACT

A method of controlling an active seatbelt includes checking whether a seatbelt is fastened, collecting driving information from a sensor or driving assist/safety system installed in a vehicle, determining a safety state of the vehicle based on the driving information, checking whether an airbag is deployed, and outputting a motor control signal for restraint control of the seatbelt in response to the safety state when the airbag is not deployed.

26 Claims, 7 Drawing Sheets

(51) Int. Cl.
  *B62D 15/02* (2006.01)
  *B60R 22/48* (2006.01)
  *B60W 50/00* (2006.01)
  *B60R 21/013* (2006.01)
  *B60R 21/00* (2006.01)
(52) U.S. Cl.
  CPC ....... *B60W 50/0098* (2013.01); *B62D 15/021* (2013.01); *B60R 2021/0018* (2013.01); *B60R 2021/01034* (2013.01); *B60R 2021/01265* (2013.01); *B60R 2021/01286* (2013.01); *B60R 2022/4816* (2013.01); *B60W 2520/125* (2013.01); *B60W 2520/14* (2013.01); *B60W 2520/18* (2013.01); *B60W 2520/28* (2013.01)
(58) Field of Classification Search
  CPC ....... B60W 2520/125; B60W 2520/28; B60W 50/00; B62D 15/021; B62D 15/02
  See application file for complete search history.

(56) References Cited

U.S. PATENT DOCUMENTS

| | | | |
|---|---|---|---|
| 2005/0146128 A1* | 7/2005 | Midorikawa | B60R 21/01 280/807 |
| 2006/0064218 A1 | 3/2006 | Subbian et al. | |
| 2007/0017726 A1 | 1/2007 | Takemura | |
| 2007/0228704 A1* | 10/2007 | Cuddihy | B60R 21/0132 280/735 |
| 2009/0099735 A1* | 4/2009 | McCoy | B60R 21/0134 701/46 |

FOREIGN PATENT DOCUMENTS

| | | |
|---|---|---|
| KR | 10-1305896 B1 | 9/2013 |
| KR | 10-2016-0058480 A | 5/2016 |

* cited by examiner

APPARATUS AND METHOD FOR CONTROLLING VEHICULAR ACTIVE SEATBELT

This application is based on and claims the benefit of priority to Korean Patent Application No. 10-2017-0175912, filed on Dec. 20, 2017, which is hereby incorporated by reference as if fully set forth herein.

TECHNICAL FIELD

The present disclosure relates to an apparatus and method for controlling a vehicular active seatbelt, and more particularly, to an apparatus and method for actively controlling an active seatbelt positioned in a vehicle seat in response to state information that is collected or detected during vehicle driving.

BACKGROUND

In general, a seatbelt is an example of a safety device for elastically restraining a passenger body to prevent serious injury when sudden shock due to collision or crash during driving is applied. A vehicular seatbelt is operatively connected to a seatbelt indicator that notifies a driver about a wearing state because of importance of wearing the seatbelt. The seatbelt indicator is configured in such a way that a vehicular electronic control unit (ECU) receives a signal of a contact sensor installed in the form of a buckle of a seatbelt and lights a belt display included in a cluster using the signal or continuously sounds an alarm using a buzzer instead of the belt display and, thus, notifies the driver about a wearing state of the seatbelt.

In addition, an active seatbelt (ASB) is configured in such a way that a driving motor installed in the seatbelt pre-pulls or instantly pulls the seatbelt to definitely fix a passenger to a seat when forward collision is predicted or an emergency such as a sharp turn occurs and, thus, is proposed as a smart safety system for minimizing passenger injury due to shock. However, a conventional active seatbelt control apparatus has a limit in that an active seatbelt is not normally operated when danger of a rollover accident occurs, e.g., when emergency braking is not performed by a forward collision avoidance assist system (FCA) or a vehicle descends along the embankment or climbs up a hill. In addition, when the FCA malfunctions and crash/collision occurs in a non-braking state, the conventional active seatbelt control apparatus has difficulty in actively controlling a seatbelt.

SUMMARY

An objective of the present disclosure is to provide an apparatus and method for recognizing a rollover accident and an emergency situation during driving on a rough road and transmitting a signal for control of a pre-safe seat belt (PSB) by an airbag control unit (ACU), thereby enhancing performance for protecting a passenger via advance restraint control.

Another objective of the present disclosure is to provide an apparatus and method for determining a situation in which a vehicle is in danger of a rollover accident and controlling a pre-safe seat belt (PSB) to restrain (fasten) an electric seatbelt in advance before an airbag is deployed.

Another objective of the present disclosure is to provide an apparatus and method for controlling a pre-safe seat belt (PSB) using an airbag control unit (ACU) for collecting driving state information of a vehicle for safety of a passenger to simplify specifications of a controller for control of the PSB, thereby enhancing productivity.

Additional advantages, objectives, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objectives and other advantages and in accordance with the purpose of the invention, as embodied and broadly described herein, a method of controlling an active seatbelt includes checking whether a seatbelt is fastened, collecting driving information from a sensor or driving assist/safety system installed in a vehicle, determining a safety state of the vehicle based on the driving information, checking whether an airbag is deployed, and outputting a motor control signal for restraint control of the seatbelt in response to the safety state in a state in which the airbag is not deployed.

The driving information may include wheel speed, a steering angle, lateral acceleration, a yaw rate, rollover angular velocity, and a rollover angle.

the safety state of the vehicle may include at least one of a first condition about whether vehicle speed in a traveling direction is greater than predetermined threshold speed, a second condition about whether lateral speed of the vehicle is greater than a predetermined first threshold value, or a third condition for determining a rollover situation of the vehicle.

The rollover situation may be determined in response to the rollover angular velocity and the rollover angle and the third condition may be greater than a threshold value that is lower than a condition in which an airbag disposed at a lateral side in the vehicle is deployed.

The driving information may be transmitted from a yaw rate sensor, an inertial measurement sensor, and a rollover detection sensor.

The driving information may include vehicle speed and a value transmitted from a rollover detection sensor.

The rollover detection sensor may output Y-direction acceleration (Low Y), Z-direction acceleration (Low Z), and rollover angular velocity (Roll rate).

The method may further include calculating a rollover angle from the rollover angular velocity.

The determining of the safety state of the vehicle may include determining whether all of the Y-direction acceleration (Low Y), the Z-direction acceleration (Low Z), the rollover angular velocity (Roll rate), and the rollover angle are greater than respective predetermined threshold values.

The method may further include feeding back an operation state of a seatbelt motor, corresponding to the motor control signal, to an airbag controller and displaying information on a vehicle instrument panel in response to the motor control signal.

The driving information may include advance information on crash danger and the restraint control of the seatbelt may be performed before the vehicle detects crash.

The method may further include not performing the restraint control when the airbag is deployed.

The motor control signal controls a seatbelt motor in response to a pulse width or a current level.

In another aspect of the present disclosure, a computer readable recording medium has recorded thereon the aforementioned method of controlling the active seatbelt by executing an application program by a processor.

The computer readable recording medium may include an application program for executing the aforementioned method of controlling the active seatbelt.

In another aspect of the present disclosure, a apparatus for controlling an active seatbelt includes a seatbelt motor configured to control restraint and release of a seatbelt, a seatbelt driving controller configured to output a motor control signal for control of the seatbelt motor, and an airbag control unit (ACU) configured to provide a determination result for determining the motor control signal, wherein the ACU may determine a safety state based on driving information collected during vehicle driving and, then, determine the determination result in response to whether an airbag is deployed.

The ACU may include a processor which includes condition determination module configured to determine a rollover state of the vehicle, an airbag controller configured to detect crash of the vehicle to deploy the airbag, and a seatbelt control determination module configured to determine a safety state based on the driving information and to determine the determination result in response to the rollover state and whether the airbag is deployed, which are transmitted from the condition determination module and the airbag controller.

The seatbelt control determination module may permit the motor control signal for restraint control of the seatbelt to be output in response to the safety state in a state in which the airbag is not deployed, and the restraint control may not be performed in a state in which the airbag is deployed.

The ACU may further include a collision sensor configured to detect collision of the vehicle, a rollover detection sensor configured to detect rollover of the vehicle, and an inertial measurement unit (IMU) configured to measure acceleration and rotary motion of the vehicle.

The driving information may include wheel speed, a steering angle, lateral acceleration, a yaw rate, rollover angular velocity, and a rollover angle.

The ACU may determine the safety state in response to at least one of a first condition about whether vehicle speed in a traveling direction is greater than predetermined threshold speed, a second condition about whether lateral speed of the vehicle is greater than a predetermined first threshold value, or a third condition for determining a rollover situation of the vehicle.

The rollover situation may be determined in response to the rollover angular velocity and the rollover angle and the third condition may be greater than a threshold value that is lower than a condition in which an airbag disposed at a lateral side in the vehicle is deployed.

The driving information may be transmitted from a yaw rate sensor, an inertial measurement sensor, and a rollover detection sensor.

The driving information may include vehicle speed and a value transmitted from a rollover detection sensor.

The rollover detection sensor may output Y-direction acceleration (Low Y), Z-direction acceleration (Low Z), and rollover angular velocity (Roll rate).

The ACU may calculate a rollover angle from the rollover angular velocity.

The ACU may determine whether all of the Y-direction acceleration (Low Y), the Z-direction acceleration (Low Z), the rollover angular velocity (Roll rate), and the rollover angle are greater than respective predetermined threshold values.

The ACU may feed an operation state of a seatbelt motor, corresponding to the motor control signal, back to the airbag controller and display information on a vehicle instrument panel in response to the motor control signal.

The driving information may include advance information on crash danger, and the determination result may be output before the vehicle detects crash.

The motor control signal may control a seatbelt motor in response to a pulse width or a current level.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present disclosure, examples of which are illustrated in the accompanying drawings. In addition, the suffixes "module" and "unit" of elements herein are used for convenience of description and thus can be used interchangeably and do not have any distinguishable meanings or functions.

In description of exemplary embodiments, it will be understood that, when an element is referred to as being "on" or "under" another element, the element can be directly on another element or intervening elements may be present. In addition, when an element is referred to as being "on" or "under" another element, this may include the meaning of an upward direction or a downward direction based on one component.

Figure 1A:
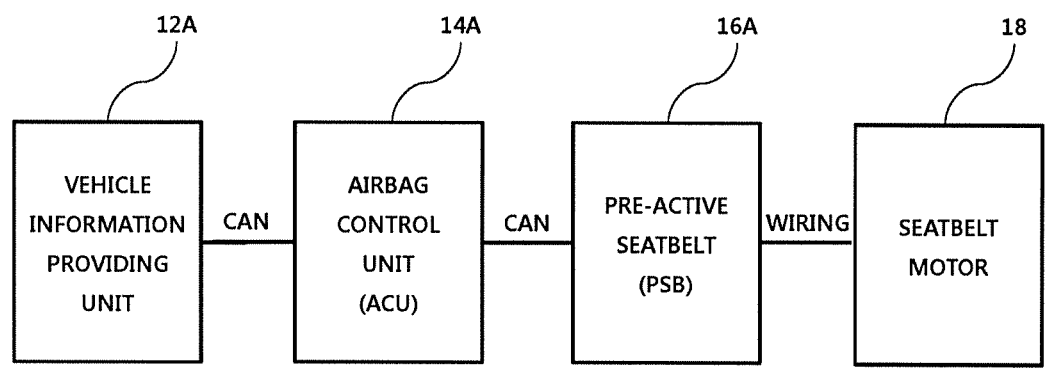
FIG. 1A is a diagram for explanation of a first example of an apparatus for controlling an active seatbelt.
Figure 1B:
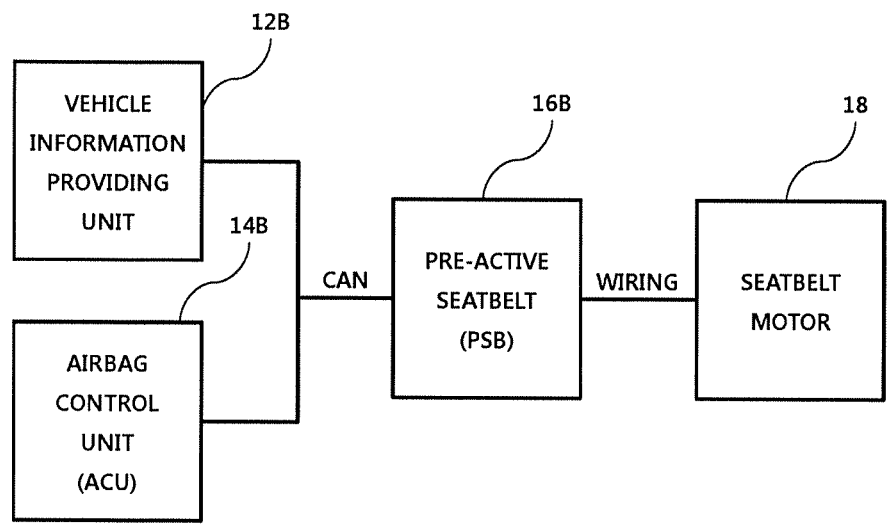
FIG. 1B is a diagram for explanation of a second example of an apparatus for controlling an active seatbelt.

FIG. 1A is a diagram for explanation of a first example of an apparatus for controlling an active seatbelt. FIG. 1B is a diagram for explanation of a second example of an apparatus for controlling an active seatbelt. In detail, referring to FIGS. 1A and 1B, the apparatuses for controlling an active seatbelt may have different structures depending on a connection form between an airbag control apparatus and an active seatbelt apparatus through a vehicular network.

Referring to FIG. 1A, the apparatus for controlling an active seatbelt may include a vehicle information providing unit 12A, an airbag control unit (ACU) 14A, a pre-active seatbelt (PSB) 16A, and a seatbelt motor 18. Here, the vehicle information providing unit 12A may collect and transmit driving information used to determine a situation for restraint control of the PSB 16A, such as vehicle speed, a vehicle behavior, a buckle state, and a collision warning system. The ACU 14A may determine and control an operating state of the PSB 16A. The PSB 16A may include a driving driver for directly driving the seatbelt motor 18.

Referring to FIG. 1B, according to another exemplary embodiment of the present disclosure, an ACU 14B may be connected to a vehicle information providing unit 12B and a PSB 16B via CAN communication that is a vehicular network. FIG. 1A illustrates the case in which the vehicle information providing unit 12A is connected to the PSB 16A through the ACU 14A and, on the other hand, FIG. 1B illustrates the case in which the vehicle information providing unit 12A is connected directly to the PSB 16A. The PSB 16B and the seatbelt motor 18 may be connected to each other through a wire but not network communication.

Referring to FIGS. 1A and 1B, the apparatus for controlling an active seatbelt may include the seatbelt motor 18 for controlling restraint and release of a seatbelt, the PSBs 16A and 16B including a seatbelt driving controller 58 for outputting a motor control signal for control of the seatbelt motor, and the ACUs 14A and 14B for providing the determination result for determining the motor control signal. Here, the seatbelt driving controller 58 may be an electric circuitry that executes instructions of software which thereby performs various functions described hereinafter. The ACUs 14A and 14B may determine a safety state based on driving information collected during vehicle driving and, then, determine the determination result in response to whether an airbag is deployed.

Figure 2:
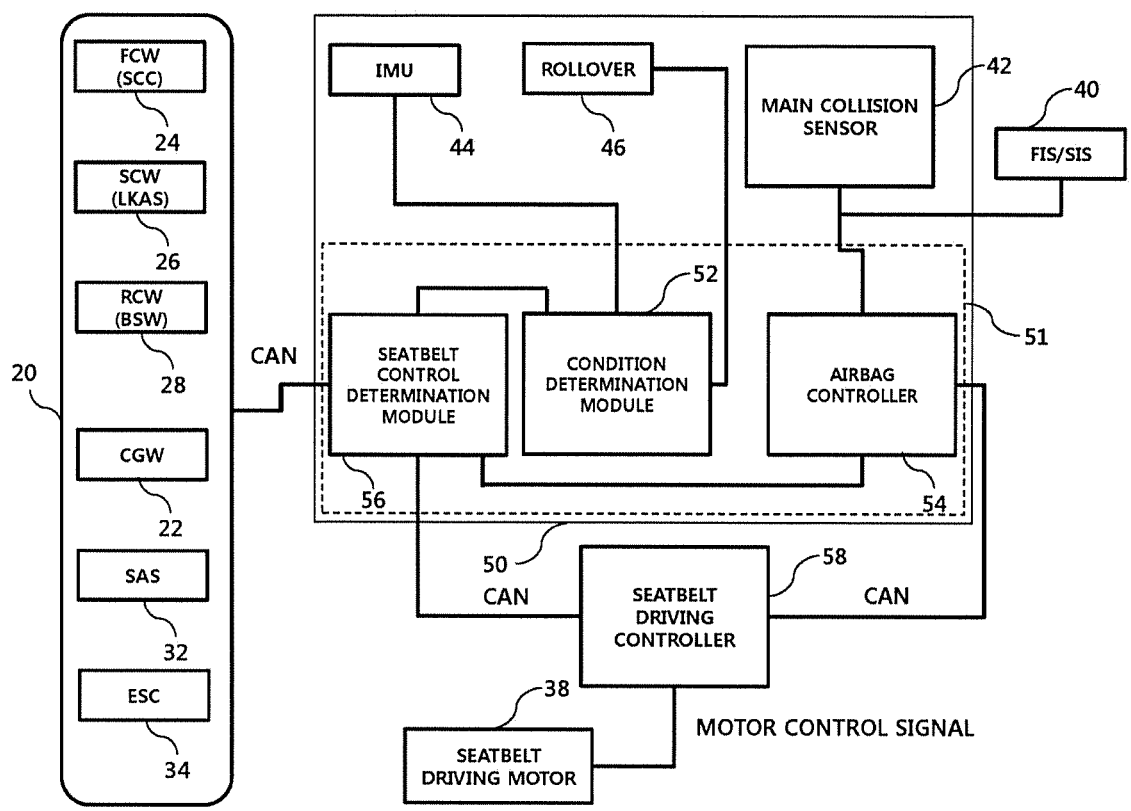
FIG. 2 is a diagram for explanation of a third example of an apparatus for controlling an active seatbelt.

FIG. 2 is a diagram for explanation of a third example of an apparatus for controlling an active seatbelt.

As shown in the drawing, the apparatus for controlling an active seatbelt may include a vehicle information providing unit 20 including a plurality of sensors or detectors for collecting driving information of a vehicle.

The plurality of sensors or detectors included in the vehicle information providing unit 20 may be changed in some embodiments. For example, the plurality of sensors or detectors may include a forward collision warning system (FCW) 24, a side collision warning system (SCW) 26, a rear collision warning system (RCW) 28, and so on. In some embodiments, the forward collision warning system (FCW) for warning a driver about danger when danger of forward collision with a leading vehicle may also be provided through smart cruise control (SCC) for driving a vehicle while mainlining a predetermined distance from a leading vehicle. The side collision warning system (SCW) for warning a driver about danger when danger of side collision with a neighboring vehicle positioned at a lateral side may also be provided through a lane keeping assist system (LKAS) for control of vehicle steering as well as for warning a driver about danger using vibration, sound, or the like upon determining that the vehicle departs from a road or a lane. The rear collision warning system (RCW) for warning a driver about danger when rear collision with a neighboring vehicle positioned at a rear side may also be provided through a blind spot warning system (BSW) that detects a vehicle or an object when the vehicle or the object approaches a left/right blind spot during vehicle driving and notifies the driver of the information. Information on the possibility of vehicle collision or crash may be pre-collected through a plurality of warning devices installed in a vehicle and the information may be provided to an airbag control unit (ACU) 50 that is connected to the warning devices using a CAN communication method as a vehicular network.

The vehicle information providing unit 20 may include a central gateway (CGW) 22 that is connected to a head unit for transmitting information on whether a seatbelt is fastened. In addition, the vehicle information providing unit 20 may further include a steering angle sensor (SAS) 32 for detecting the manipulation speed and angle of a steering wheel to perform steering control, vehicle dynamic control (VDC), ABS control, and so on, and an electronic stability control device (ESC) 34 for analyzing a state of the steering wheel to adjust a traveling direction of a vehicle when a target direction of the vehicle is different from an actual direction.

The ACU 50 may include a processor 51 having a non-transitory memory storing software instructions which, when executed by the processor 51, provide the functionalities of: a condition determination module 52 for determining a rollover state of a vehicle, an airbag controller 54 for detecting vehicle crash to deploy an airbag, and a seatbelt control determination module 56 for determining a safety state based on driving information and for determining a determination result in response to the information on the rollover state and whether the airbag is deployed, which are transmitted from the condition determination module 52 and the airbag controller 54. The airbag controller 54 of the processor 51 may collect information on crash from a front/side impact sensor (FIS/SIS) 40 that detects acceleration or pressure and transmits the detected information to the ACU in an initial crash stage.

The seatbelt control determination module 56 of the processor 51 may permit a motor control signal for restraint control of a seatbelt to be output from a seatbelt driving controller 58 in response to a safety state in which an airbag is not deployed and may not permit the seatbelt driving controller 58 to perform restraint control in a state in which an airbag is deployed.

In some embodiments, the ACU 50 may further include a collision sensor 42 for detecting vehicle collision, a rollover detection sensor 46 for detecting vehicle rollover, and an inertial measurement unit (IMU) 44 for measuring acceleration and rotary motion of a vehicle.

Driving information transmitted from the vehicle information providing unit 20 may include wheel speed, a steering angle, lateral acceleration, a yaw rate, rollover angular velocity, and a rollover angle.

The ACU 50 may determine a first condition about whether vehicle speed in a traveling direction is greater than predetermined threshold speed, a second condition about whether vehicle lateral speed is greater than a predetermined first threshold value, and a third condition for determination of a vehicle rollover situation and determine a safety state in response to a determination result. For example, the rollover situation may be determined in response to rollover angular velocity and a rollover angle and the third condition may be greater than a threshold value that is lower than a condition in which an airbag disposed at a lateral side in the vehicle is deployed.

In some embodiments, the driving information may be transmitted from a yaw rate sensor, an inertial measurement sensor, and a rollover detection sensor. In addition, the driving information may include a value transmitted from a vehicle speed and rollover detection sensor. For example, the rollover detection sensor may output Y-direction acceleration (Low Y), Z-direction acceleration (Low Z), and rollover angular velocity (Roll rate).

The ACU 50 may calculate the rollover angle from the rollover angular velocity. For example, the condition determination module 52 may receive the rollover angular velocity and calculate the rollover angle and, then, transmit the rollover angle to the seatbelt control determination module 56.

The ACU 50 may determine whether all of the Y-direction acceleration (Low Y), the Z-direction acceleration (Low Z), the rollover angular velocity (Roll rate), and a rollover angle are greater than respective predetermined threshold values. For example, the seatbelt control determination module 56 may determine whether driving information from the vehicle information providing unit 20 or the condition determination module 52 is greater than a corresponding threshold value to determine a current state of a vehicle. Upon determining that a driver and a passenger in a vehicle are in danger, a seatbelt may be further restrained to enhance safety of the driver or the passenger.

The ACU 50 may feed an operation state of a seatbelt motor, corresponding to the motor control signal, back to the airbag controller 54 and display information on a vehicle instrument panel (e.g., a display) in response to the motor control signal. In particular, the driving information may include advance information on crash danger and the determination result of the seatbelt control determination module 56 may be output before a vehicle detects crash.

The motor control signal output from the seatbelt driving controller 58 may have a pulse width or current level for restraining a seatbelt and a seatbelt driving motor 38 may restrain a seatbelt in response to the pulse width or the current level.

In some embodiments, the ACU 50 may receive information from an external forward collision sensor, a side collision sensor, and the like in the case of current forward/side collision and perform a crash algorithm for deploying an airbag using an internal crash sensor. The ACU 50 may determine whether a seatbelt is restrained based on the driving information received from the inertial measurement unit (IMU) 44 including a yaw rate sensor and an Ax and Ay acceleration sensor, for checking a behavior degree such as vehicle rotation, and the rollover detection sensor 46 including a roll rate sensor and an Ax and Ay acceleration sensor, for detecting a rollover accident of a vehicle. In addition, the ACU 50 may include the condition determination module 52 and the seatbelt control determination module 56, for determining a condition about a restraint function of a seatbelt using the driving information of the vehicle and the information transmitted from the IMU 44 and the collision sensor 42. The seatbelt driving controller 58 may output the motor control signal according to the information determined by the seatbelt control determination module 56 that receives information on airbag deployment from the airbag controller 54 and determines seatbelt restraining.

In some embodiments, the seatbelt control determination module 56 may perform an algorithm for determining control of a plurality of seatbelts or include a plurality of determination logics or circuits. For example, the condition determination module 52 may estimate a dynamic condition for estimating a condition such as vehicle rollover and a traverse behavior using information output from the IMU 44, information output from the rollover detection sensor 46, a steering angle, vehicle speed, and brake pressure information. The seatbelt control determination module 56 may include a first condition determination module for determining control of a dynamic condition of a restraint operation of a seatbelt using information output from the condition determination module 52 and information on whether a seatbelt is fastened, and a second condition determination module for determining whether a seatbelt is restrained using free crash determination information of a vehicle, information on whether a seatbelt is fastened, and basic crash algorithm information of the airbag controller 54.

Figure 3:
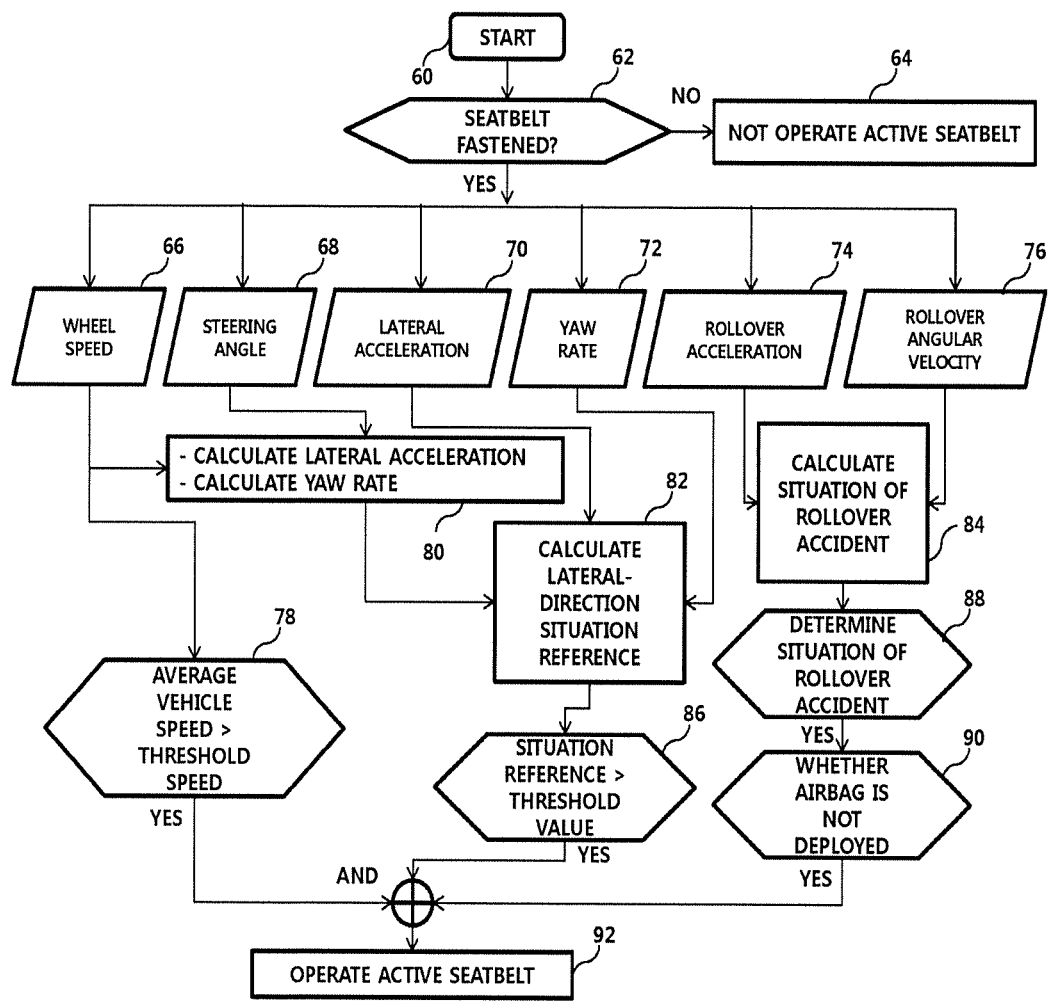
FIG. 3 is a diagram for explanation of a first example of a method of controlling an active seatbelt.

FIG. 3 is a diagram for explanation of a first example of a method of controlling an active seatbelt.

As shown in the drawing, the method of controlling the active seatbelt may be started (60) by checking whether a seatbelt is fastened (62). Control of an active seatbelt may be performed for every seatbelt in a vehicle. When the seatbelt is not fastened, control of the active seatbelt may not be performed (64). Then, whether average vehicle speed is equal to or greater than threshold speed may be checked based on information on wheel speed 66 (78). When the vehicle speed is lower than the threshold speed, control of the active seatbelt may not be performed.

In some embodiments, to control the active seatbelt, lateral acceleration or a yaw rate may be calculated using information on a steering angle 68 and the wheel speed 66 (80). In some embodiments, lateral acceleration 70 and yaw rate 72 may be received to perform calculation corresponding to a lateral-direction situation (80). Then, the value calculated in response to the lateral-direction situation and a threshold value may be compared (86). Rollover acceleration 74 and rollover angular velocity 76 may be received and, then, calculation corresponding to a situation of a rollover accident may be performed (84). Then, the rollover situation may be determined based on the calculated value (88) and whether an airbag is deployed may be checked (90). When all of the third conditions are satisfied through the aforementioned procedure, the active seatbelt may be operated (92).

In some embodiments, in the operating method of the active seatbelt, whether a seatbelt is fastened may be determined, a restraint operation of an active seatbelt may not be performed when the seatbelt is not fastened, and a time point when the restraint operation of the active seatbelt is to be performed may be determined through an airbag controller when the seatbelt is fastened. As shown in the drawing, the situation for the restraint operation of the active seatbelt may be determined using the wheel speed 66, the steering angle 68, the lateral acceleration 70, the yaw rate 72, collision acceleration (not shown), the rollover acceleration 74, and the rollover angular velocity 76. When a lateral-direction situation reference value, which is calculated using factor values used to calculate lateral acceleration and a yaw rate using the wheel speed 66 and the steering angle 68 and information of the lateral acceleration 70 and the yaw rate 72, is greater than a situation reference threshold value (86), the restraint operation of the active seatbelt may be performed. The restraint operation of the active seatbelt may be performed only when average vehicle speed is greater than predetermined threshold speed based on the wheel speed 66 (78).

Figure 4:
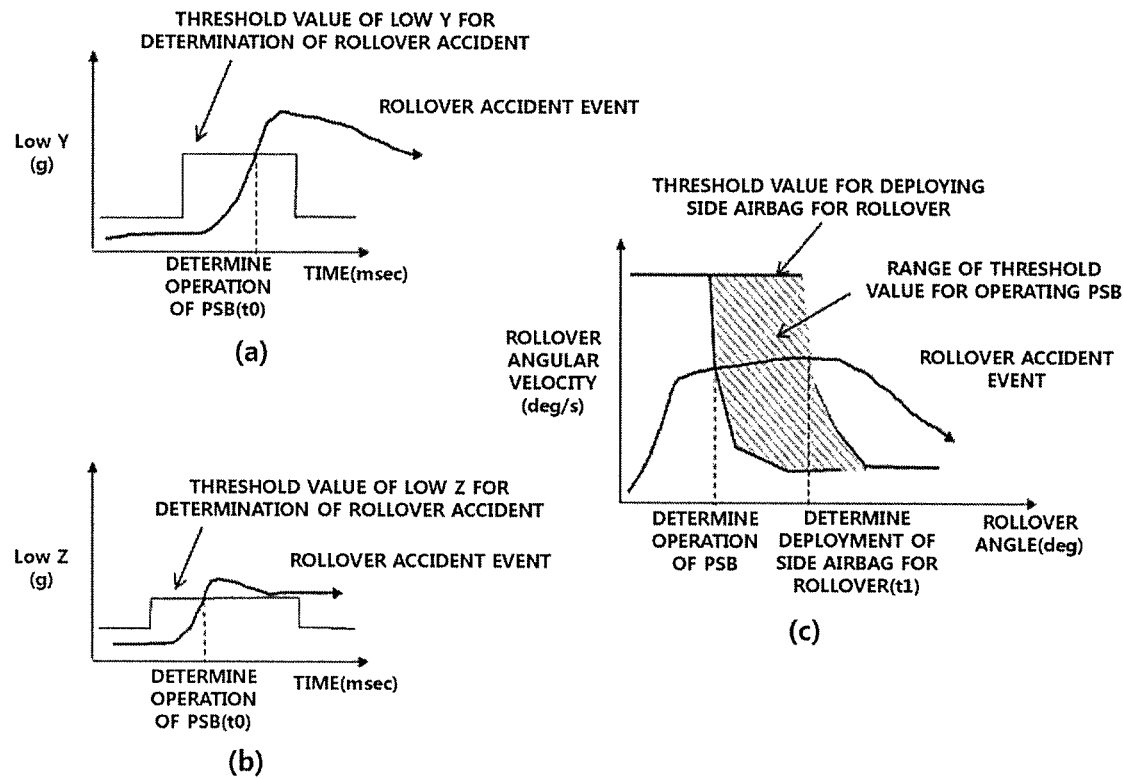
FIG. 4 is a diagram for explanation of a time point of restraint control of an active seatbelt.

FIG. 4 is a diagram for explanation of a time point of restraint control of an active seatbelt. In detail, FIG. 4 shows determination of a time point at which a restraint operation of an active seatbelt is performed in response to collected information during vehicle driving.

As shown in the drawings, (a) to (c) of FIG. 4 respectively show examples of setting threshold values of Y-direction acceleration (Low Y), Z-direction acceleration (Low Z), rollover angular velocity (Roll rate), and rollover angle (Roll Angle) when a rollover accident occurs. To set threshold values of the rollover angular velocity and the rollover angle for performing the restraint operation of the active seatbelt, a range of a threshold value for performing a restraint operation of a separate active seatbelt may be set and the restraint operation of the active seatbelt may be performed in advance prior to determination of whether a side airbag is deployed for rollover.

Figure 5:
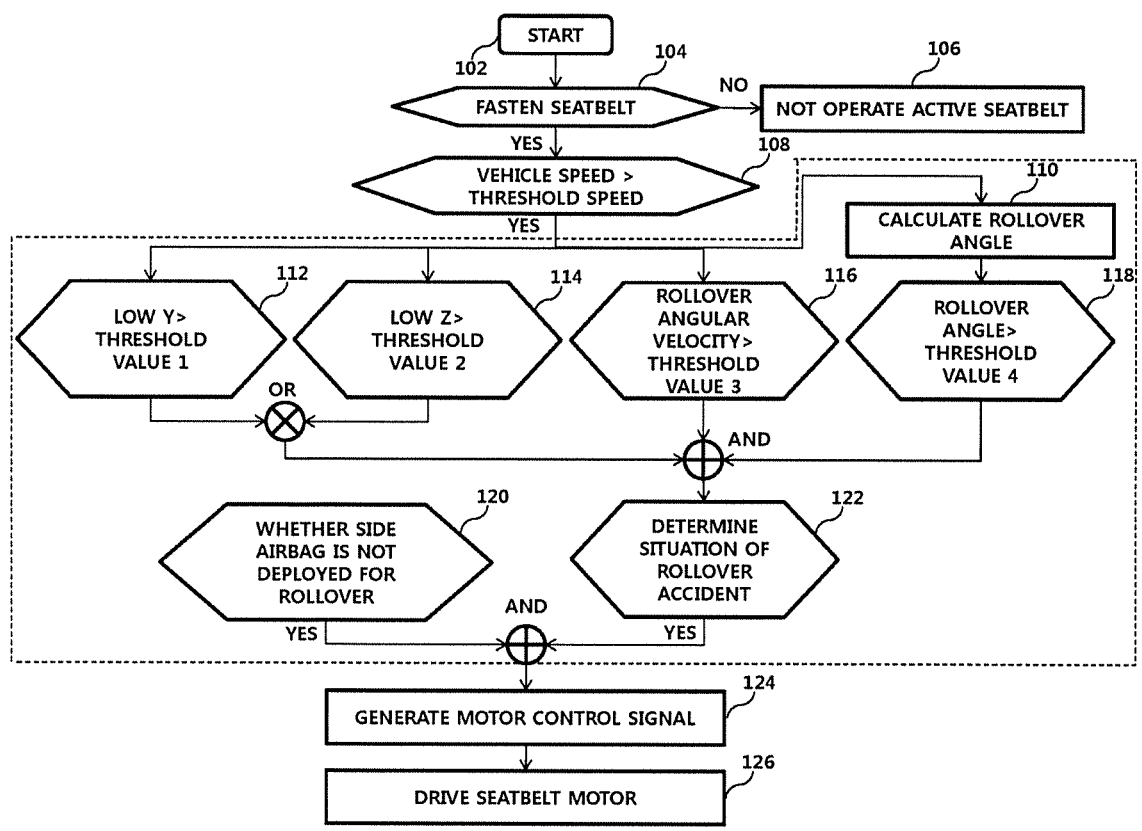
FIG. 5 is a diagram for explanation of a second example of the method of controlling an active seatbelt.

FIG. 5 is a diagram for explanation of a second example of the method of controlling an active seatbelt.

As shown in the drawing, the method of controlling the active seatbelt may perform a dynamic rollover algorithm of an airbag control unit (ACU) that determines whether a seatbelt is fastened (104), does not perform a restraint operation of an active seatbelt when the seatbelt is not fastened (106), and performs the restraint operation of the active seatbelt when the seatbelt is fastened and average vehicle speed is greater than predetermined threshold speed based on wheel speed (108).

The dynamic rollover algorithm of the airbag control unit (ACU) may determine a rollover situation when a value of Y-direction acceleration (Low Y), Z-direction acceleration (Low Z), rollover angular velocity (Roll rate), and rollover angle (Roll Angle) of a rollover sensor is greater than a threshold value tuned according to the characteristics of a vehicle (112, 114, 116, and 118). To this end, the rollover angle may be calculated from the rollover angular velocity (110). Whether the Y-direction acceleration (Low Y) and the Z-direction acceleration (Low Z) are greater than respective predetermined threshold values (threshold value 1 and threshold value 2) may be determined. When at least one of the Y-direction acceleration (Low Y) or the Z-direction acceleration (Low Z) is greater than a threshold value, whether the rollover angular velocity (Roll rate) and the rollover angle (Roll Angle) are greater than respective predetermined threshold values (threshold value 3 and threshold value 4) may be determined. When a rollover accident is determined (122), if whether a side airbag for rollover is deployed is checked and the side airbag is not deployed (120), the ACU may lastly determine a rollover accident and generate a motor control signal for permitting a motor driver for a restraint operation of an active seatbelt to perform the restraint operation of the active seatbelt (124). The seatbelt motor may be driven in response to the motor control signal (126).

Figure 6:
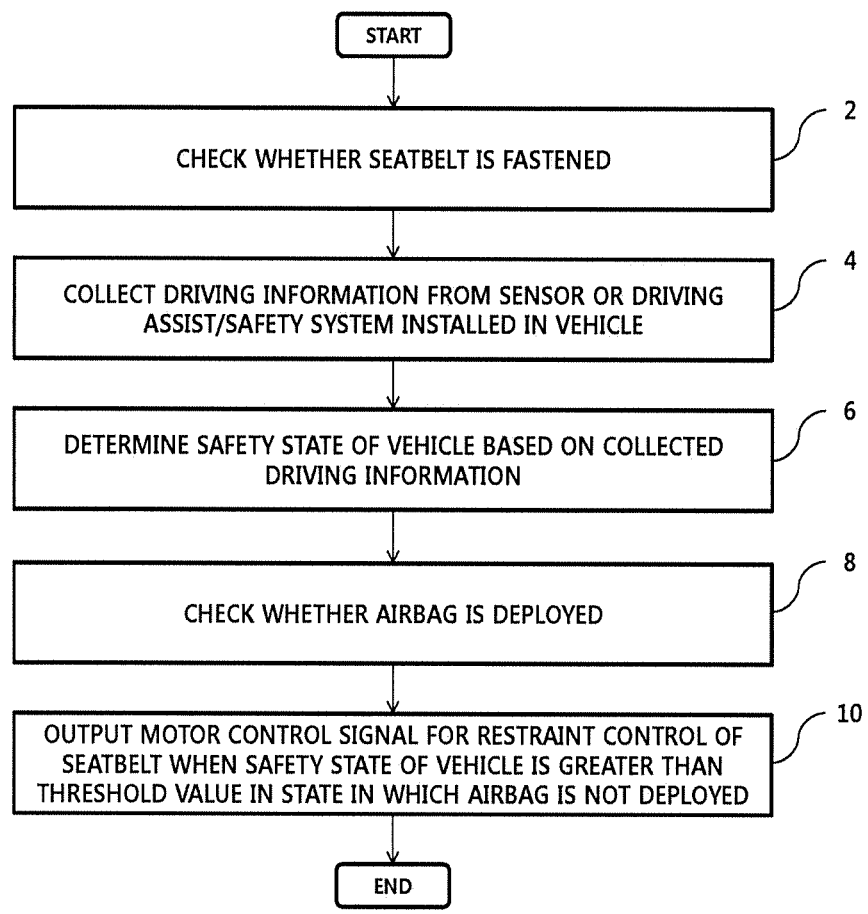
FIG. 6 is a diagram for explanation of a third example of the method of controlling an active seatbelt.

FIG. 6 is a diagram for explanation of a third example of the method of controlling an active seatbelt.

As shown in the drawing, the method of controlling an active seatbelt may include checking whether a seatbelt is fastened (2), collecting driving information from a sensor or driving assist/safety system installed in a vehicle (4), determining a safety state of the vehicle based on the driving information (6), checking whether an airbag is deployed (8), and outputting a motor control signal for a restraint control of a seatbelt in response to the safety state when the airbag is not deployed (10).

The driving information used in the method of controlling an active seatbelt may include wheel speed, a steering angle, lateral acceleration, a yaw rate, rollover angular velocity, and a rollover angle. The safety state of the vehicle determined in the method of controlling an active seatbelt may include a first condition about whether vehicle speed in a traveling direction is greater than predetermined threshold speed, a second condition about whether lateral speed of the vehicle is greater than a predetermined first threshold value, and a third condition for determining a rollover situation of a vehicle. In some embodiments, the rollover situation may be determined in response to the rollover angular velocity and the rollover angle and the third condition may be greater than a threshold value that is lower than a condition in which an airbag disposed at a lateral side in the vehicle is deployed.

In some embodiments, the driving information used in the method of controlling an active seatbelt may be transmitted from a yaw rate sensor, an inertial measurement sensor, and a rollover detection sensor. In addition, the driving information may include a value transmitted from a vehicle speed and rollover detection sensor. For example, the rollover detection sensor may output Y-direction acceleration (Low Y), Z-direction acceleration (Low Z), and rollover angular velocity (Roll rate). The method of controlling an active seatbelt may further include calculating the rollover angle from the rollover angular velocity.

The determining of the safety state of the vehicle (6) may include determining whether all of the Y-direction acceleration (Low Y), the Z-direction acceleration (Low Z), the rollover angular velocity (Roll rate), and a rollover angle are greater than respective predetermined threshold values.

Although not shown, the method of controlling an active seatbelt may further include feeding back an operating state of a seatbelt motor corresponding to the motor control signal to the airbag controller and displaying information on a vehicle instrument panel in response to the motor control signal.

The driving information used in the method of controlling an active seatbelt may include advance information on crash danger and restraint control of the seatbelt may be performed before the vehicle detects crash.

In the method of controlling an active seatbelt, the restraint control may not be performed when the airbag is deployed. Control of the active seatbelt may be independently performed from seatbelts installed in a vehicle and, when a seatbelt is not fastened, it may not be necessary to perform additional control or algorithms, to which the method of controlling the active seatbelt is applied, on the corresponding seatbelt.

To control the active seatbelt, the motor control signal may control the seatbelt motor in response to a pulse width or a current level. The seatbelt motor may additional restrain the seatbelt in response to the pulse width or the current level.

The method according to the aforementioned embodiment can also be embodied as computer readable code on a computer readable recording medium. Examples of the computer readable recording medium include read-only memory (ROM), random-access memory (RAM), CD-ROMs, magnetic tapes, floppy disks, optical data storage devices, etc.

The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

The apparatus according to the present disclosure may have the following effects.

According to the present disclosure, an airbag control unit (ACU) for collecting information on safety of a passenger among various driving assist devices or safety driving devices to be installed in a vehicle may control an active seatbelt to enhance the safety of the passenger and to simplify a configuration of a controller of a pre-active seatbelt (PSB), thereby reducing manufacturing costs of vehicles.

According to the present disclosure, the controller of the pre-active seatbelt (PSB) may be operatively connected to a seatbelt in such a way that the seatbelt is pre-fastened before information from the airbag control unit (ACU) is collected and an airbag is operated, thereby enhancing the safety of the passenger.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

It will be apparent to those skilled in the art that various modifications and variations can be made in the present disclosure without departing from the spirit or scope of the inventions. Thus, it is intended that the present disclosure cover the modifications and variations of this invention provided they come within the scope of the appended claims and their equivalents.

What is claimed is:

1. A method of controlling an active seatbelt, the method comprising:
    checking whether a seatbelt is fastened;
    collecting driving information from a sensor or driving assist/safety system installed in a vehicle;
    determining a safety state of the vehicle based on the driving information;
    checking whether an airbag is deployed; and
    outputting a motor control signal for restraint control of the seatbelt in response to the safety state when the airbag is not deployed,
    wherein the safety state is determined based on a condition for determining a rollover situation of the vehicle,
    the rollover situation of the vehicle is determined in response to a rollover angular velocity and a rollover angle, and
    the condition for determining the rollover situation of the vehicle is greater than a threshold value that is lower than a condition in which the airbag disposed at a lateral side in the vehicle is deployed.

2. The method of claim 1, wherein the driving information comprises wheel speed, a steering angle, lateral acceleration, a yaw rate, the rollover angular velocity, and the rollover angle.

3. The method of claim 2, wherein the safety state of the vehicle comprises at least one of:
    a first condition related to whether vehicle speed in a traveling direction is greater than a predetermined threshold speed;
    a second condition related to whether lateral speed of the vehicle is greater than a predetermined first threshold value; or
    a third condition for determining the rollover situation of the vehicle.

4. The method of claim 2, wherein the driving information is transmitted from a yaw rate sensor, an inertial measurement sensor, and a rollover detection sensor.

5. The method of claim 1, wherein the driving information comprises vehicle speed and a value transmitted from a rollover detection sensor.

6. The method of claim 5, wherein the rollover detection sensor outputs Y-direction acceleration (Low Y), Z-direction acceleration (Low Z), and rollover angular velocity (Roll rate).

7. The method of claim 6, further comprising calculating a rollover angle from the rollover angular velocity.

8. The method of claim 7, wherein the determining of the safety state of the vehicle comprises determining whether all of the Y-direction acceleration (Low Y), the Z-direction acceleration (Low Z), the rollover angular velocity (Roll rate), and the rollover angle are greater than respective predetermined threshold values.

9. The method of claim 1, further comprising:
    feeding an operation state of a seatbelt motor, corresponding to the motor control signal, back to an airbag controller; and
    displaying information on a vehicle instrument panel in response to the motor control signal.

10. The method of claim 1, wherein the driving information comprises information pertaining to crash danger; and
    wherein the restraint control of the seatbelt is performed before the vehicle detects a crash.

11. The method of claim 1, further comprising not performing the restraint control when the airbag is deployed.

12. The method of claim 1, wherein a seatbelt motor is controlled in response to the motor control signal based on a pulse width or a current level of the motor control signal.

13. An apparatus for controlling an active seatbelt, the apparatus comprising:
    a seatbelt motor configured to control restraint and release of a seatbelt;
    a seatbelt driving controller configured to output a motor control signal for control of the seatbelt motor; and
    an airbag control unit (ACU) configured to provide a determination result for determining the motor control signal,
    wherein the ACU determines a safety state based on driving information collected during vehicle driving and, then, determines the determination result in response to whether an airbag is deployed,
    the safety state is determined based on a condition for determining a rollover situation of a vehicle,
    the rollover situation of the vehicle is determined in response to a rollover angular velocity and a rollover angle, and
    the condition for determining the rollover situation of the vehicle is greater than a threshold value that is lower than a condition in which the airbag disposed at a lateral side in the vehicle is deployed.

14. The apparatus of claim 13, wherein the ACU comprises a processor which includes:
    a condition determination module configured to determine a rollover state of the vehicle;
    an airbag controller configured to detect a crash of the vehicle to deploy the airbag; and
    a seatbelt control determination module configured to determine a safety state based on the driving information and to determine the determination result in response to the rollover state and whether the airbag is deployed, which are transmitted from the condition determination module and the airbag controller.

15. The apparatus of claim 14, wherein the seatbelt control determination module permits the motor control signal for restraint control of the seatbelt to be output in response to the safety state when the airbag is not deployed; and
    wherein the restraint control is not performed in a state in which the airbag is deployed.

16. The apparatus of claim 14, wherein the ACU further comprises:
    a collision sensor configured to detect a collision of the vehicle;
    a rollover detection sensor configured to detect rollover of the vehicle; and an inertial measurement unit (IMU) configured to measure acceleration and rotary motion of the vehicle.

17. The apparatus of claim 13, wherein the driving information comprises wheel speed, a steering angle, lateral acceleration, a yaw rate, the rollover angular velocity, and the rollover angle.

18. The apparatus of claim 17, wherein the ACU determines the safety state in response to at least one of:
- a first condition related to whether vehicle speed in a traveling direction is greater than a predetermined threshold speed;
- a second condition related to whether lateral speed of the vehicle is greater than a predetermined first threshold value; or
- a third condition for determining the rollover situation of the vehicle.

19. The apparatus of claim 17, wherein the driving information is transmitted from a yaw rate sensor, an inertial measurement sensor, and a rollover detection sensor.

20. The apparatus of claim 13, wherein the driving information comprises vehicle speed and a value transmitted from a rollover detection sensor.

21. The apparatus of claim 20, wherein the rollover detection sensor outputs Y-direction acceleration (Low Y), Z-direction acceleration (Low Z), and rollover angular velocity (Roll rate).

22. The apparatus of claim 13, wherein the ACU calculates a rollover angle from the rollover angular velocity.

23. The apparatus of claim 13, wherein the ACU determines whether all of the Y-direction acceleration (Low Y), the Z-direction acceleration (Low Z), the rollover angular velocity (Roll rate), and the rollover angle are greater than respective predetermined threshold values.

24. The apparatus of claim 13, wherein the ACU feeds an operation state of a seatbelt motor, corresponding to the motor control signal, back to a processor and displays information on a vehicle instrument panel in response to the motor control signal.

25. The apparatus of claim 13, wherein the driving information comprises information pertaining to crash danger; and
  wherein the determination result is output before the vehicle detects a crash.

26. The apparatus of claim 13, wherein a seatbelt motor is controlled in response to the motor control signal based on a pulse width or a current level.

* * * * *